(12) United States Patent
Talja

(10) Patent No.: US 10,135,745 B2
(45) Date of Patent: Nov. 20, 2018

(54) INFORMATION DISTRIBUTION

(71) Applicant: Rovio Entertainment Ltd, Espoo (FI)

(72) Inventor: Ari Talja, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 639 days.

(21) Appl. No.: 14/314,073

(22) Filed: Jun. 25, 2014

(65) Prior Publication Data

US 2015/0381504 A1    Dec. 31, 2015

(51) Int. Cl.
G06F 15/16 (2006.01)
H04L 12/859 (2013.01)
H04L 12/58 (2006.01)

(52) U.S. Cl.
CPC .......... H04L 47/2475 (2013.01); H04L 51/30 (2013.01)

(58) Field of Classification Search
CPC ......... H04L 47/2475; H01L 2924/0002; G06F 17/30433
See application file for complete search history.

(56) References Cited

U.S. PATENT DOCUMENTS

| | | | | |
|---|---|---|---|---|
| 6,459,682 B1 * | 10/2002 | Ellesson | ............. | H04L 41/5003 370/235 |
| 6,928,482 B1 * | 8/2005 | Ben Nun | ............. | H04L 67/1008 370/235 |
| 2008/0195475 A1 * | 8/2008 | Lambert | ............. | G06Q 30/0207 705/14.1 |
| 2013/0167181 A1 * | 6/2013 | Dixit | ................. | H04N 21/6131 725/95 |
| 2014/0058827 A1 * | 2/2014 | Svirsky | .................. | G06Q 30/02 705/14.43 |
| 2015/0134463 A1 * | 5/2015 | Jalali | .................. | G06Q 30/0275 705/14.71 |
| 2015/0170222 A1 * | 6/2015 | Els | ..................... | G06Q 30/0275 705/14.71 |

* cited by examiner

Primary Examiner — Moustafa M Meky
Assistant Examiner — Sm Z Islam
(74) Attorney, Agent, or Firm — Squire Patton Boggs (US) LLP

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to obtain, for each of a plurality of pacing units, a planned number of impressions associated with a current time, define, for each of the plurality of pacing units, a difference between the planned number of impressions associated with the current time and an actual number of impressions associated with the current time, adjust a score of at least one of the plurality of pacing units based at least in part on the difference, and select one of the plurality of pacing units based at least in part on scores of each of the plurality of pacing units.

20 Claims, 6 Drawing Sheets

INFORMATION DISTRIBUTION

FIELD OF INVENTION

The present invention relates to the field of controlling disseminating of information from a plurality of sources.

BACKGROUND OF INVENTION

Information can be disseminated in a variety of ways. For example, newspapers may be used, signs may be erected along road-sides, mail or e-mail may be sent, or internet streaming may be employed to transmit information to one or more recipients, which may comprise processes or persons. In industrial processes, control information to modify the functioning of an industrial process, such as for example a plastic pellet manufacturing process, may be delivered using electrical leads.

A set of recipients of information may be pre-defined, as in the case of sending email, or the set of recipients may be open, as in the case of radio broadcasts. Electronic delivery of information can be directed to specific recipients or more generically. For example, cellular telephone calls can be switched to a specific mobile telephone number, whereas informational bulletins in computer operating systems may be directed to any user of the operating system.

Electronic communication offers the possibility to deliver information to a large group of persons or processes, wherein it may be preferable to not deliver exactly the same information to all recipients at the same time. For example, when manufacturing plastic pellets, it may be advantageous to, over a time period, deliver the same instructions to a plurality of process units, but in case all units receive identical instructions at exactly the same time, unwanted spikes in electricity usage may be caused.

Similarly, when communicating to people, in case all people receive the same message at the same time, their reactions may overload systems. Also simply delivering a large email simultaneously to thousands of people may overload an email distribution system. Moreover, communication opportunities to all people, or all processes, may not be present at the same time, rather processes may poll a control aggregator, or people may view an information source, at random or pseudo-random times.

SUMMARY OF THE INVENTION

According to a first aspect of the present invention, there is provided an apparatus comprising at least one processing core, at least one memory including computer program code, the at least one memory and the computer program code being configured to, with the at least one processing core, cause the apparatus at least to obtain, for each of a plurality of pacing units, a planned number of impressions associated with a current time, define, for each of the plurality of pacing units, a difference between the planned number of impressions associated with the current time and an actual number of impressions associated with the current time, adjust a score of at least one of the plurality of pacing units based at least in part on the difference, and select one of the plurality of pacing units based at least in part on scores of each of the plurality of pacing units.

Various embodiments of the first aspect may comprise at least one feature from the following bulleted list:

- the at least one memory and the computer program code are configured to, with the at least one processing core, cause the selecting based at least in part on at least one of the following: suitability based on a frequency condition and an empty content threshold
- each of the plurality of pacing units comprises a start time, an end time, a target number of impressions and an association to at least one media unit
- the actual number of impressions associated with the current time comprises, for each pacing unit, a number of impressions of the at least one media unit associated with the pacing unit during a length of time extending from the start time to the current time
- the at least one memory and the computer program code are configured to, with the at least one processing core, cause the obtaining, for each of the plurality of pacing units, of the planned number of impressions associated with a current time based at least in part on a schedule of impressions
- the schedule of impressions is based, at least in part, on historical data describing user activity as a function of time
- the apparatus is configured to modify the schedule of impressions based at least in part on at least one of: a holiday season, a product launch and a foreseen hardware outage
- the apparatus is configured to adjust the score of the at least one of the plurality of pacing units by an increment obtained by multiplying the difference between the planned number of impressions associated with the current time and the actual number of impressions by a constant
- the apparatus is configured to select the constant in dependence of whether the difference is greater or lesser than zero.

According to a second aspect of the present invention, there is provided a method comprising obtaining, for each of a plurality of pacing units, a planned number of impressions associated with a current time, defining, for each of the plurality of pacing units, a difference between the planned number of impressions associated with the current time and an actual number of impressions associated with the current time, adjusting a score of at least one of the plurality of pacing units based at least in part on the difference, and selecting one of the plurality of pacing units based at least in part on scores of each of the plurality of pacing units.

Various embodiments of the second aspect may comprise at least one feature corresponding to a feature from the preceding bulleted list laid out in connection with the first aspect.

According to a third aspect of the present invention, there is provided an apparatus comprising means for obtaining, for each of a plurality of pacing units, a planned number of impressions associated with a current time, means for defining, for each of the plurality of pacing units, a difference between the planned number of impressions associated with the current time and an actual number of impressions associated with the current time, means for adjusting a score of at least one of the plurality of pacing units based at least in part on the difference, and means for selecting one of the plurality of pacing units based at least in part on scores of each of the plurality of pacing units.

According to a fourth aspect of the present invention, there is provided a non-transitory computer readable medium having stored thereon a set of computer readable instructions that, when executed by at least one processor, cause an apparatus to at least obtain, for each of a plurality of pacing units, a planned number of impressions associated with a current time, define, for each of the plurality of pacing units, a difference between the planned number of impressions associated with the current time and an actual number of impressions associated with the current time, adjust a score of at least one of the plurality of pacing units based at least in part on the difference, and select one of the plurality of pacing units based at least in part on scores of each of the plurality of pacing units.

INDUSTRIAL APPLICABILITY

At least some embodiments of the present invention find industrial application in controlling dissemination of information to processes or persons.

DETAILED DESCRIPTION OF EXAMPLE EMBODIMENTS

By scoring information pacing units based on a difference between a planned delivery schedule and an achieved delivery amount, pacing units that are behind their delivery schedules can be given higher priority, increasing the chances of success in implementing an information dissemination plan. By decreasing scores of pacing units that are ahead of their delivery schedules, opportunities for the pacing units that are behind may be created.

Figure 1:
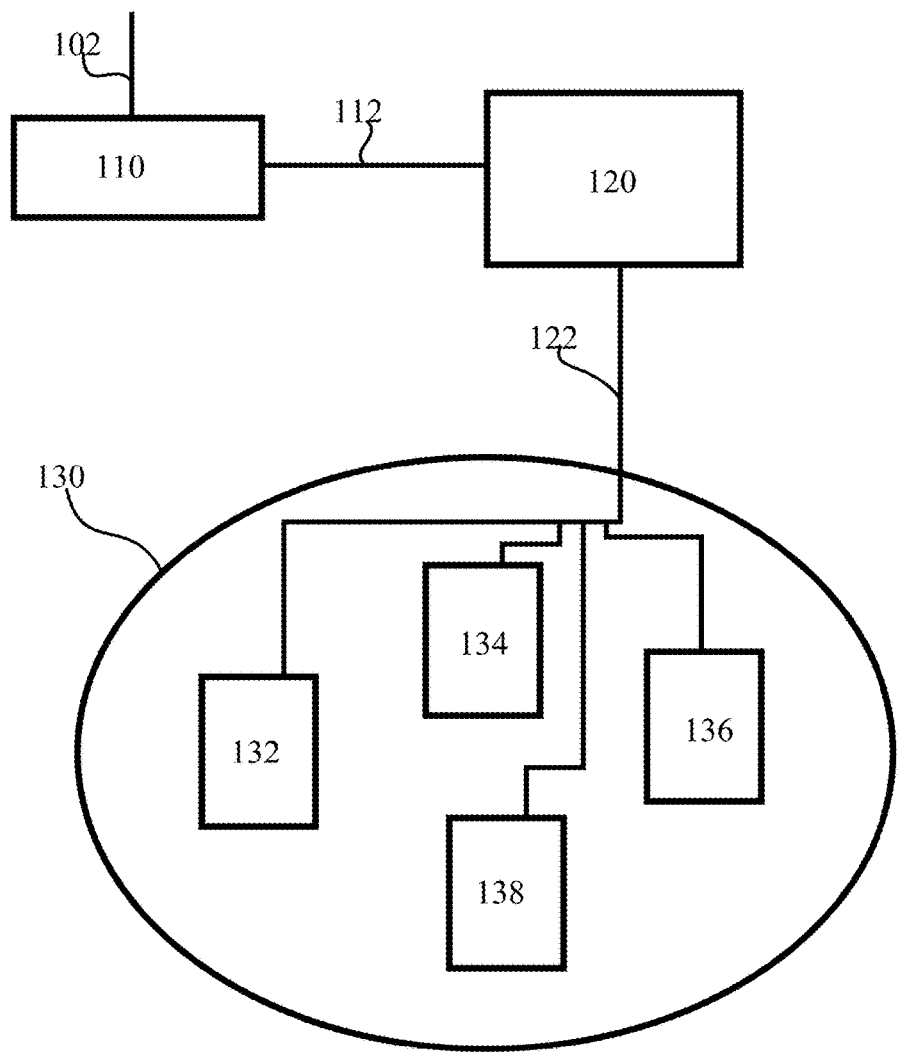
FIG. 1 illustrates an example system capable of supporting at least some embodiments of the present invention.

FIG. 1 illustrates an example system capable of supporting at least some embodiments of the present invention. Control unit 110 may comprise a computer, such as for example a laptop or desktop computer, configured to control, via connection 112, distribution system 120. Connection 112 may comprise a wire-line or an at least in part wireless connection. Connection 112 may traverse, at least in part, at least one communication network. Distribution system 120 may comprise a data aggregator, website, website generator, digital platform, server, gateway or other suitable apparatus or system. Control unit 110 may be controllable, at least in part, via connection 102. Such control may be remote from the physical location of control unit 110. In some embodiments, control unit 110 and distribution system 120 are comprised in the same physical unit. Control unit 110 and/or distribution system 120 may comprise a computing cluster.

Set 130 comprises units 132, 134, 136 and 138. Although four units are illustrated, it is to be understood set 130 may comprise another number of units as well, for example in the range of tens of thousands, hundreds of thousands or even millions of units. Membership in set 130 may be fluid as a unit is understood to be comprised in set 130 in case it requests information from distribution system 120. In other words, any unit that requests information from distribution unit 120 is considered to be comprised in set 130. Units comprised in set 130 may communicate with distribution system 120 via at least one network, which is illustrated as connection 122. In some embodiments, not all units comprised in set 130 need to communicate with distribution system 120 via the same network or networks.

Information distribution system 120 may be configured to provide, for example responsive to requests, content with embedded media units, such that a provided content item may comprise one or more than one embedded media unit. Embedded media units may be associated with pacing units. In general a media unit may comprise, for example, an image or a video clip.

As a first example, set 130 may comprise users that access a web page hosted or controlled by distribution system 120. In this first example, the provided content item is the web page and media units embedded therein comprise images or videos. As a second example, set 130 comprises manufacturing units of a factory, which request instructions from distribution system 120. In this second example, the provided content item comprises a data entity wherein the media units are embedded. Such media units may comprise numerical or text-based process instructions, for example. Process instructions may comprise instructions concerning temperature, flow, ionization percentage or water content, for example. As a third example, set 130 comprises users of a computer program, the program being configured to request information periodically or non-periodically from distribution system 120. In this third example, the provided content item comprises a data entity, such as an XML page, wherein media units comprising program update instructions are embedded. As an example technical effect, in the last example, various versions, such as language versions, of the program may be caused to update in a controlled fashion without overloading an update server infrastructure.

As a fourth example, distribution system 120 comprises an advertisement insertion system configured to provide advertising content to the units comprised in set 130. The units in set 130 may comprise consumer devices that run a game, for example, the game being configured to provide advertising slots. Media items received from distribution system 120 are in this fourth example inserted into the advertising slots in the game. The provided content item in which the media units are comprised may in this fourth example comprise a simply data container used to transmit the media unit, or units, to the consumer devices.

Media units may be associated with pacing units. A pacing unit may comprise, in general, a start time, an end time, a target number of impressions and an association to at least one media unit. The start time may indicate when the pacing unit becomes active, and the end time may indicate, when the pacing unit is meant to cease to be active. The target number of impressions indicates a number of times distribution system 120 is meant to provide a media unit associated with the pacing unit to a unit comprised in set 130. In general, a pacing unit may define a planned campaign to disseminate, between the start time and the end time, the target number of impressions of the at least one associated media unit. An impression may comprise a provision of a media unit associated with the pacing unit. Where a media unit comprises a video clip, an impression may be defined as one of the following: firstly, a provision of the video clip, secondly, a start of playback of the video clip, thirdly, that the video clip is played at least until a threshold, and finally, that the entire video clip is played. Feedback may be required for some definitions of video clip impression to be registered.

Providing a media unit may comprise providing information defining the contents of a media unit, such as providing a digital image, or providing link information that enables retrieval of the media unit.

Figure 2A:
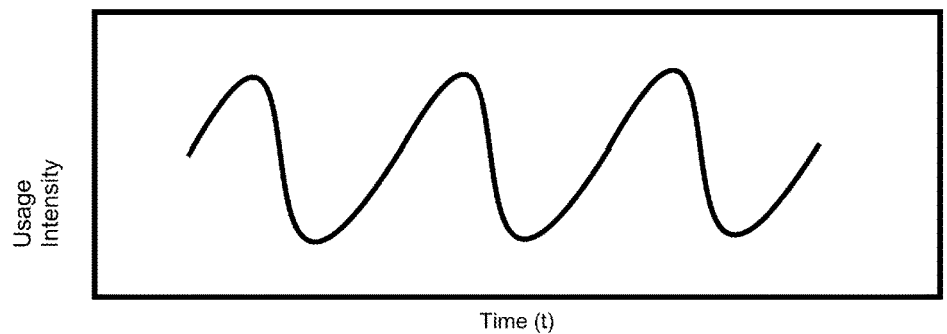
FIG. 2A illustrates an example usage profile.

FIG. 2A illustrates an example usage profile. In the figure, time advances from left to right and usage intensity increases from the bottom toward the top. Use fluctuates according to times of day, during the day use is more intensive than during the night. For example, units comprised in set 130 of FIG. 1 may request information from distribution system 120 in a time-varying way such that an average number of information requests per unit of time is higher during the day and lower during the night. In such a scenario, distribution system 120 has more frequent opportunities to provide media units during daytime.

Figure 2B:
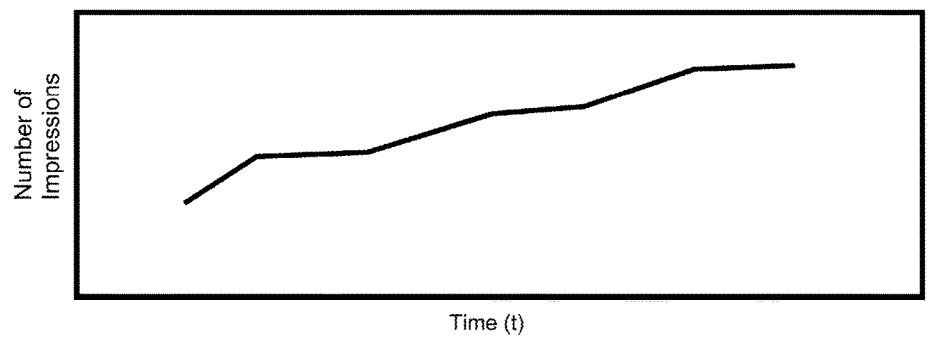
FIG. 2B illustrated an example pacing schedule.

FIG. 2B illustrated an example pacing schedule. The schedule may be designed, or obtained, at least in part based on history data, such as for example the usage profile of FIG. 2A. A pacing unit may be assigned a pacing schedule, wherein it is anticipated that in peak usage times more impressions per unit of time occur than in non-peak usage times. In FIG. 2A, the cumulative number of impressions increases from bottom toward the top, and one can see from the figure that most of the increase occurs during peak times, when the angle of ascent of the curve is higher than during non-peak times.

Figure 2C:
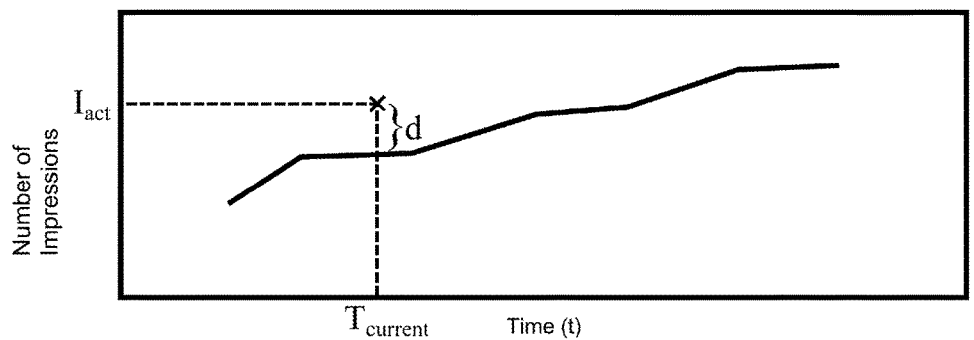
FIG. 2C illustrates an example difference in implementation of a pacing schedule.

FIG. 2C illustrates an example difference in implementation of a pacing schedule. The curve underlying FIG. 2C is the same pacing schedule as that illustrated in FIG. 2B. The "x" in FIG. 2C denotes an actual number of impressions, $I_{act}$, of the pacing unit the schedule of which is illustrated in FIG. 2C, at the current time, which is indicated on the horizontal axis as $T_{current}$. As can be seen, the actual number of impressions is above the pacing schedule for $T_{current}$, indicating that more impressions have occurred than planned for, in other words the pacing unit is running ahead of its schedule, by a margin, or difference, denoted by "d" in FIG. 2C. To more accurately follow the pacing schedule, a priority, or score, of this pacing unit may be reduced as will be described hereinbelow.

Figure 3:
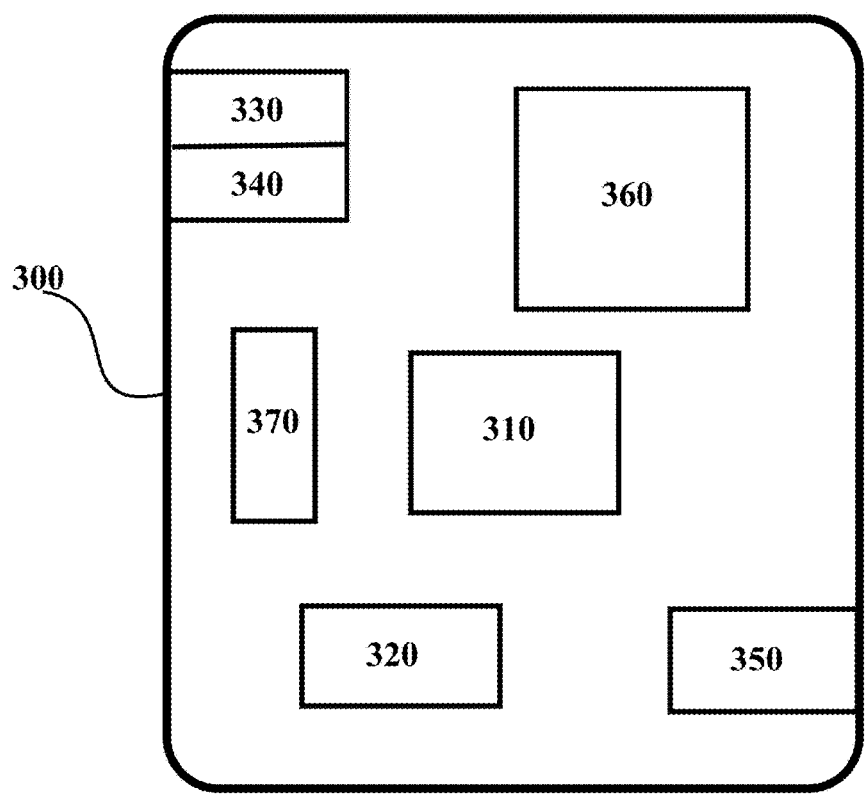
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, controller 110 or distribution system 120 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Ethernet, wideband code division multiple access, WCDMA, or other standards.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure pacing units.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
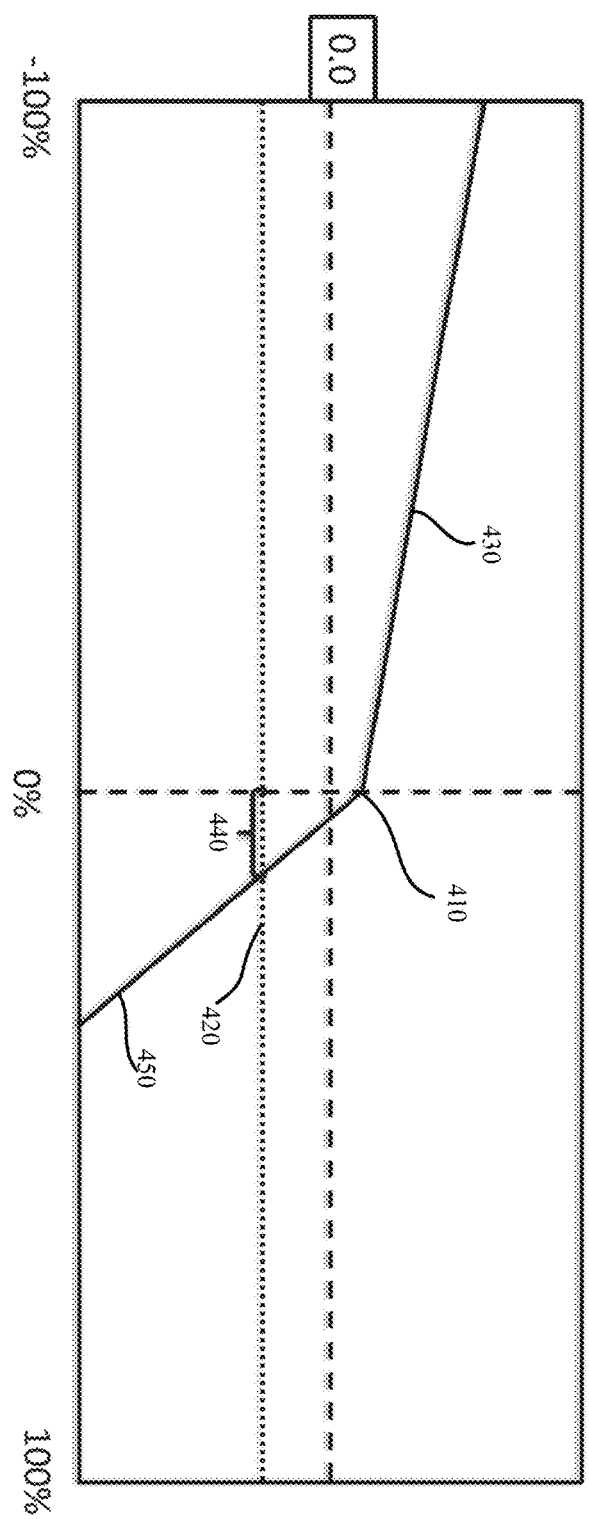
FIG. 4 illustrates example procedures for scoring a pacing unit.

FIG. 4 illustrates example procedures for scoring a pacing unit. The horizontal axis, extending from −100% to 100%, represents a difference between an actual number of impressions and a planned number of impressions, as a percentage of the planned number of impressions. Therefore, 100% on this axis represents a case where all planned impressions have been conducted when no time has passed and −100% represents a case where no impressions have been conducted and the entire time has passed. The vertical axis, perpendicular to the horizontal axis, represents a score assigned to the pacing unit.

Examining first the section of the horizontal axis which lies between −100% and 0%, this area corresponds to situations where the actual number of impressions is behind schedule, that is, fewer impressions have been conducted than was planned for the current time. The curve 430 increases from 0% deficit to 100% deficit, which is denoted as −100%. In other words, the more the pacing unit is behind schedule, the higher is the score assigned to it. This has the effect that pacing units that are most behind have the highest score, which causes them to be assigned more resources, which will cause them to catch up with their schedule.

Examining then the section of the horizontal axis which lies between 0% and 100%, this area corresponds to situations where the actual number of impressions is ahead of schedule, that is, more impressions have been conducted than was planned for the current time. This situation is illustrated also in FIG. 2C. The curve 450 decreases from 0% surplus onward, causing a score assigned to the pacing unit to be lower the more the more the pacing unit is ahead of schedule, with the effect that the pacing unit is assigned fewer resources, and consequently the pacing unit may fall back toward the schedule.

The slope angles of curves 430 and 450 need not be the same, indeed in FIG. 4 the slope of curve 450 is steeper than that of curve 430. This arrangement will have the effect that the pacing unit will not be given the opportunity to get very much ahead of schedule, since its assigned score will decline rapidly the further it gets ahead.

The dotted horizontal line 420, below score 0.0, corresponds to an empty content threshold. An empty content threshold may be configured to denote a lowest score that will cause a pacing unit to be given an impression. In case a score of a pacing unit declines below the empty content threshold, that pacing unit will be excluded from impressions. In other words, an empty content item may be provided, or even no content item, rather than a content item providing a media unit associated with a pacing unit with a score that is below the empty content threshold.

Point 410 along the vertical axis denotes a base value for a pacing unit. This reflects a score given to the pacing unit when it is exactly on schedule, meaning that the number of impressions is neither ahead nor behind schedule.

Space 440 indicated along the empty content threshold indicates a maximum overshoot of impressions. This is so since should the number of impressions be ahead of schedule by an amount larger than space 440, the score of the pacing unit would be below the empty content threshold and consequently it would be excluded from impressions. If a pacing unit ends up below the empty content threshold, it will not be given resources, that is impressions, until the schedule advances so that the number of actual impressions is ahead by less than percentage 440, and the score of the pacing unit once more exceeds the empty content threshold. Since a number of planned impressions tends to increase with time in dependence of the schedule, in case no impressions are give to a pacing unit it correspondingly tends to drift toward the left along the horizontal axis. Therefore a pacing unit isn't left permanently with a score below the empty content threshold.

When configuring the pacing unit, the difference between empty content threshold 420 and base value 410 can assume a central importance in guaranteeing that the target number of impressions is achieved by the end time.

Overall, since the score of a pacing unit declines when it runs ahead of schedule, and increases when it falls behind, the effect of the scoring system illustrated in FIG. 4 is that pacing units are maintained more or less at the scheduled rate of impressions. Pacing units that are ahead are assigned fewer impressions, giving more opportunity to pacing units that are behind, these latter pacing units also receiving higher scores than the former ones.

In addition to pacing units assigned scores dynamically along the lines described in FIG. 4, filler campaigns may be configured that have constant scores. These scores may lie between score zero and the empty content threshold, for example. Filler campaigns, unlike pacing units, may be associated with no particular target impression count.

Priorities of pacing units may be used to configure the slope angles of curves 430 and 450. For example, in case curve 430 is configured to ascend steeply as the pacing unit falls further and further behind, it is rendered less unlikely this pacing unit will fall much behind since its score, and thus impression rate, will rise to overcome any falling behind.

To select a pacing unit for an impression, control unit 110 or distribution system 120 may determine scores of all active pacing units and select the highest-scoring pacing unit for impression, that is, distribution system 120 would provide at least one content item that comprises a media unit associated with this selected pacing unit. Scoring of pacing units may be performed responsive to each incoming request for information, or alternatively periodically, such as for example every second, every minute or every hour.

In case scoring is performed periodically, the highest-scoring pacing unit may be given all impressions until the next scoring is performed. Alternatively, between periodic scorings, impressions may be allocated in a proportional way between active pacing units, such that the highest-scoring pacing unit is given most impressions and the second-highest scoring pacing unit is given second-most impressions, and so on.

In some embodiments, requests for information are associated with different opportunities for media units, for example, an image size restriction may limit the choice of pacing units to use. In such cases, the pacing unit may be chosen along the lines described above, from among pacing units associated with a suitable media unit. In other words, the set of active pacing units is considered to be the set of active pacing units associated with at least one suitable media unit.

In addition to scores, secondary criteria may be employed when deciding which pacing unit to give an impression to. For example, a pacing unit may be configured so that it may not receive consecutive impressions. As another example, a pacing unit may be configured to only receive impressions at night-time, or only at day-time.

Taking the pacing unit illustrated in FIG. 4 as an example, in case the actual number of impressions at the current time is 14.000 and the planned number of impressions is 15.500, the pacing unit is running behind by about 9.7%. The score of this pacing unit would then be the base score, indicated by 410, incremented by an increment indicated by curve 430 at point −9.7% along the horizontal axis. To obtain the increment, 9.7% is multiplied by a positive first constant, the first constant reflecting the slope angle of curve 430. Alternatively, if the number of actual impressions is 15.800, the pacing unit is running ahead by about 1.9%. To obtain its score, the base score indicated by 410 is incremented by an increment, which is in this case negative, obtained by multiplying 1.9% by a negative second constant that reflects the slope angle of curve 450. The skilled person will understand that variations along the same idea are easy to come by, for example by using positive constants with the sign of the percentage varying in dependence of whether the pacing unit is ahead or behind, or by using absolute numbers of impressions instead of percentages. In general a difference between planned and actual impression numbers may be expressed in terms of absolute numbers or percentages without departing from the scope of the invention.

Figure 5:
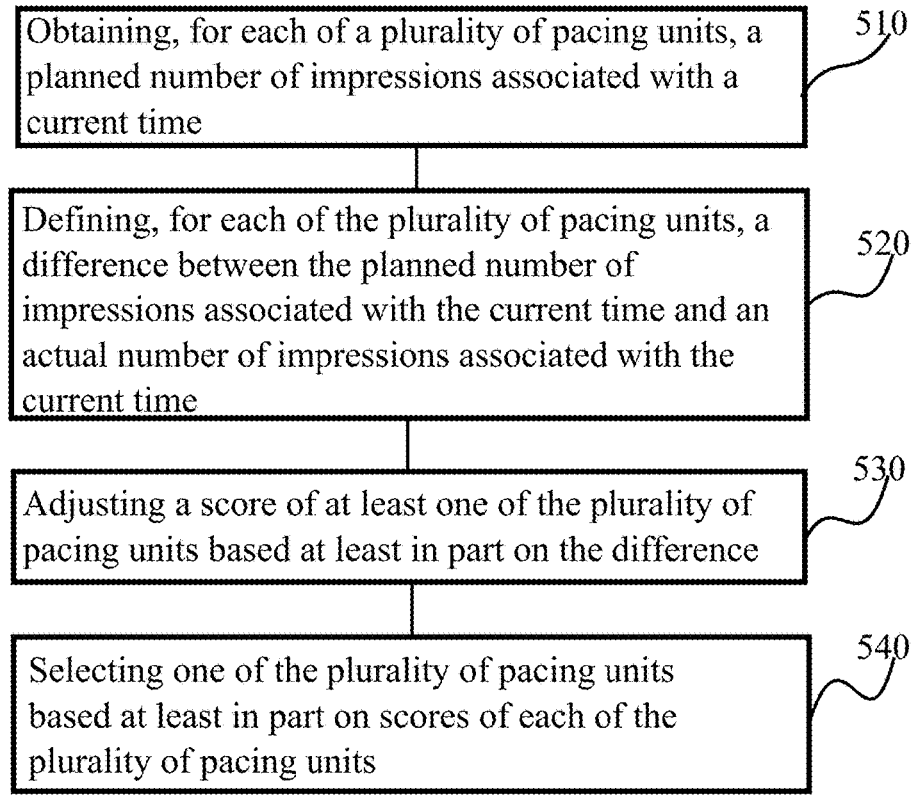
FIG. 5 is a flow chart illustrating an example method in accordance with at least some embodiments of the present invention.

FIG. 5 is a flow chart illustrating an example method in accordance with at least some embodiments of the present invention. The phases of the method may be performed in control unit 110, distribution system 120 or a combination of the two, for example.

Phase 510 comprises obtaining, for each of a plurality of pacing units, a planned number of impressions associated with a current time. Phase 520 comprises defining, for each of the plurality of pacing units, a difference between the planned number of impressions associated with the current time and an actual number of impressions associated with the current time. Phase 530 comprises adjusting a score of at least one of the plurality of pacing units based at least in part on the difference. Finally, phase 540 comprises selecting one of the plurality of pacing units based at least in part on scores of each of the plurality of pacing units.

Figure 6:
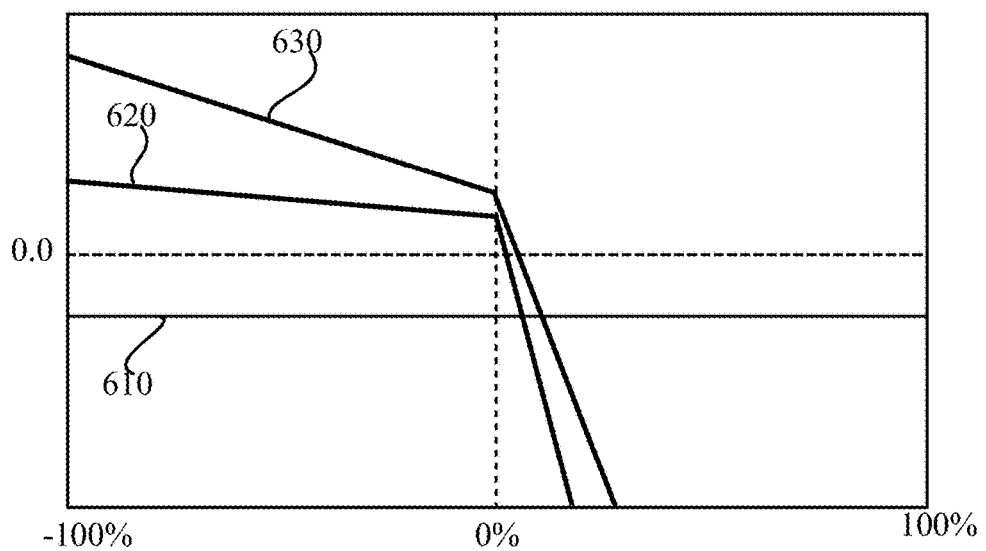
FIG. 6 illustrates two competing pacing units.

FIG. 6 illustrates two competing pacing units. The axes in FIG. 6 are similar to those in FIG. 4, the horizontal axis extending from −100% to 100% and the vertical axis representing a score.

In FIG. 6, an empty content threshold 610 represents a score below which no pacing unit is given impressions, as in FIG. 4. Pacing unit 620 competes against pacing unit 630 in FIG. 6, wherein it can be seen that pacing unit 630 has a higher priority than pacing unit 620. In detail, below 0%, that is, when the pacing units are behind their schedule, the score of pacing unit 620 increases slower than that of pacing unit 630. On the other hand, when the pacing units are ahead of their schedule, that is above 0% on the horizontal axis, the score of pacing unit 620 declines faster than that of pacing unit 630. The base score of pacing unit 630 is higher than the base score of pacing unit 620, which can be seen from the fact that pacing unit 630 is higher on the vertical axis at 0%, that is, when the pacing units are exactly on schedule in delivering impressions.

In general there is provided an apparatus, such as for example a control unit, distribution system or a control device for inclusion in a control unit or distribution system, to control the functioning thereof. The apparatus comprises at least one processing core, at least one memory including computer program code, the at least one memory and the computer program code being configured to, with the at least one processing core, cause the apparatus at least to obtain, for each of a plurality of pacing units, a planned number of impressions associated with a current time, define, for each of the plurality of pacing units, a difference between the planned number of impressions associated with the current time and an actual number of impressions associated with the current time, adjust a score of at least one of the plurality of pacing units based at least in part on the difference, and select one of the plurality of pacing units based at least in part on scores of each of the plurality of pacing units. Adjusting the score of at least one pacing unit may comprise adjusting the scores of all active pacing units. Adjusting the score of at least one pacing unit may comprise replacing a previous score with a new score. Adjusting the score of at least one pacing unit may comprise replacing a previous score with a new score, the new score being obtained by incrementing a base score by a positive or negative increment. The actual number of impressions associated with the current time may comprise the actual number of impressions between a start time of the pacing unit and the current time. The planned number of impressions associated with a current time may comprise a number of impressions planned to be performed between the start time of the pacing unit and the current time. The planned number of impressions may be obtained from a pre-calculated table, or the planned number of impressions may be calculated in connection with the obtaining, for example based on historical usage patterns.

In some embodiments, the apparatus is configured to adjust the score of the at least one of the plurality of pacing units by an increment obtained by multiplying the difference between the planned number of impressions associated with the current time and the actual number of impressions by a constant. The constant may be selected in dependence of whether the difference is greater or lesser than zero. The constant may reflect a slope angle. The slope angle may be steeper in case the difference is positive, in other words in case the actual number of impressions exceeds the planned number of impressions, and less steep in case the difference is negative, in other words in case the planned number of impressions exceeds the actual number of impressions. In general the slope angle, be it steep or less steep, may be negative in the sense that the increment used to adjust the score is smaller the larger is the number of actual impressions associated with the current time.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
    at least one processor; and
    at least one memory including computer program code,
    wherein the at least one memory and the computer program code are configured to cause the at least one processor of the apparatus at least to:
    obtain, for each of a plurality of pacing units, a planned number of impressions associated with a current time;
    define, for each of the plurality of pacing units, a difference between the planned number of impressions associated with the current time and an actual number of impressions associated with the current time;
    adjust a score of at least one of the plurality of pacing units based at least in part on the difference;
    select one of the plurality of pacing units based at least in part on scores of each of the plurality of pacing units; and
    control an amount of resources given to the selected pacing unit based on the score of the selected pacing unit,
    wherein the resources correspond to a provision of media units associated with each of the plurality of pacing units that are to be disseminated.

2. The apparatus according to claim 1, wherein the selection of the plurality of pacing units is based at least in part on at least one of the following: suitability based on a frequency condition and an empty content threshold.

3. The apparatus according to claim 1, wherein each of the plurality of pacing units comprises a start time, an end time, a target number of impressions and an association to at least one media unit.

4. The apparatus according to claim 3, wherein the actual number of impressions associated with the current time comprises, for each pacing unit, a number of impressions of the at least one media unit associated with the pacing unit during a length of time extending from the start time to the current time.

5. The apparatus according to claim 1, wherein the obtaining, for each of the plurality of pacing units, of the planned number of impressions associated with a current time is based at least in part on a schedule of impressions.

6. The apparatus according to claim 5, wherein the schedule of impressions is based, at least in part, on historical data describing user activity as a function of time.

7. The apparatus according to claim 5, wherein the apparatus is configured to modify the schedule of impressions based at least in part on at least one of: a holiday season, a product launch and a foreseen hardware outage.

8. The apparatus according to claim 1, wherein the apparatus is configured to adjust the score of the at least one of the plurality of pacing units by an increment obtained by multiplying the difference between the planned number of impressions associated with the current time and the actual number of impressions by a constant.

9. The apparatus according to claim 8, wherein the apparatus is configured to select the constant in dependence of whether the difference is greater or lesser than zero.

10. A method performed by at least one processor, comprising:
    obtaining, for each of a plurality of pacing units, a planned number of impressions associated with a current time;
    defining, for each of the plurality of pacing units, a difference between the planned number of impressions associated with the current time and an actual number of impressions associated with the current time;
    adjusting a score of at least one of the plurality of pacing units based at least in part on the difference;
    selecting one of the plurality of pacing units based at least in part on scores of each of the plurality of pacing units; and
    controlling an amount of resources given to the selected pacing unit based on the score of the selected pacing unit,
    wherein the resources correspond to a provision of media units associated with each of the plurality of pacing units that are to be disseminated.

11. The method according to claim 10, wherein the selecting is based at least in part on at least one of the following: suitability based on a frequency condition and an empty content threshold.

12. The method according to claim 10, wherein each of the plurality of pacing units comprises a start time, an end time, a target number of impressions and an association to at least one media unit.

13. The method according to claim 12, wherein the actual number of impressions associated with the current time comprises, for each pacing unit, a number of impressions of the at least one media unit associated with the pacing unit during a length of time extending from the start time to the current time.

14. The method according to claim 10, wherein the obtaining, for each of the plurality of pacing units, of the planned number of impressions associated with a current time, is based at least in part on a schedule of impressions.

15. The method according to claim 14, wherein the schedule of impressions is based, at least in part, on historical data describing user activity as a function of time.

16. The method according to claim 14, further comprising modifying, by the at least one processor, the schedule of impressions based at least in part on at least one of: a holiday season, a product launch and a foreseen hardware outage.

17. The method according to claim 10, wherein the adjusting of the score of the at least one of the plurality of pacing units is performed by an increment obtained by multiplying the difference between the planned number of impressions associated with the current time and the actual number of impressions by a constant.

18. The method according to claim 17, wherein the constant is selected in dependence of whether the difference is greater or lesser than zero.

19. The method according to claim 10, wherein the method is performed responsive to a request to deliver an impression.

20. A non-transitory computer readable medium having stored thereon a set of computer readable instructions that, when executed by at least one processor, cause an apparatus to at least:

obtain, for each of a plurality of pacing units, a planned number of impressions associated with a current time;

define, for each of the plurality of pacing units, a difference between the planned number of impressions associated with the current time and an actual number of impressions associated with the current time;

adjust a score of at least one of the plurality of pacing units based at least in part on the difference;

select one of the plurality of pacing units based at least in part on scores of each of the plurality of pacing units; and control an amount of resources given to the selected pacing unit based on the score of the selected pacing unit, wherein the resources correspond to a provision of media units associated with each of the plurality of pacing units that are to be disseminated.

* * * * *